(12) United States Patent
Yoshida et al.

(10) Patent No.: US 8,770,773 B2
(45) Date of Patent: Jul. 8, 2014

(54) LIGHT SOURCE DEVICE AND DISPLAY DEVICE

(75) Inventors: Tetsuyuki Yoshida, Tokyo (JP); Shozo Masuda, Tokyo (JP); Naoji Nada, Kanagawa (JP); Yasushi Ito, Tokyo (JP); Tsubasa Tsukahara, Tokyo (JP)

(73) Assignee: Dexerials Corporation, Tokyo (JP)

( * ) Notice: Subject to any disclaimer, the term of this patent is extended or adjusted under 35 U.S.C. 154(b) by 974 days.

(21) Appl. No.: 12/734,904

(22) PCT Filed: Nov. 27, 2008

(86) PCT No.: PCT/JP2008/071527
§ 371 (c)(1),
(2), (4) Date: Aug. 30, 2010

(87) PCT Pub. No.: WO2009/072429
PCT Pub. Date: Jun. 11, 2009

(65) Prior Publication Data
US 2010/0315320 A1    Dec. 16, 2010

(30) Foreign Application Priority Data

Dec. 7, 2007    (JP) .................................. 2007-316688
May 29, 2008   (JP) .................................. 2008-140900

(51) Int. Cl.
*F21V 9/00*    (2006.01)
*F21V 9/16*    (2006.01)

(52) U.S. Cl.
USPC ............................ 362/84; 362/97.3; 362/235

(58) Field of Classification Search
USPC ......... 362/84, 97.1–97.4, 230, 231, 235, 293, 362/330, 34, 311.02, 800
See application file for complete search history.

(56) References Cited

U.S. PATENT DOCUMENTS

| 5,211,467 | A | 5/1993 | Seder |
| 7,052,152 | B2* | 5/2006 | Harbers et al. .................. 362/84 |
| 2005/0073495 | A1* | 4/2005 | Harbers et al. ................ 345/102 |
| 2006/0072315 | A1 | 4/2006 | Han et al. |
| 2007/0030675 | A1* | 2/2007 | Oon et al. ........................ 362/84 |
| 2007/0263408 | A1 | 11/2007 | Chua |
| 2009/0180273 | A1* | 7/2009 | Kim et al. ........................ 362/84 |

FOREIGN PATENT DOCUMENTS

| JP | 2001-023420 A | 1/2001 |
| JP | 2002-133908 A | 5/2002 |
| JP | 2003-100126 A | 4/2003 |
| JP | 2003-222861 A | 8/2003 |
| JP | 2005-115372 A | 4/2005 |
| JP | 2006-344409 A | 12/2006 |
| WO | WO 2005/104252 A2 | 11/2005 |

* cited by examiner

*Primary Examiner* — Bao Q Truong
(74) *Attorney, Agent, or Firm* — Oliff PLC

(57) ABSTRACT

A light source device capable of suppressing generation of color unevenness, and a display device using the same are provided. The light source device 1 is provided with a plurality of excitation light sources 11 which are arranged at prescribed intervals D on a substrate 10 and emit blue light, and a phosphor layer 12 which converts part of the blue light emitted from the excitation light sources into red light and green light and arranged at a distance from the excitation light sources 11 to oppose the substrate 10. Fluctuation of intensity of each color light due to nonuniform application of the phosphor layer is difficult to occur as compared with a configuration in the past where the phosphor layer is formed adjacent to each excitation light source.

26 Claims, 13 Drawing Sheets (A)

(B)

LIGHT SOURCE DEVICE AND DISPLAY DEVICE

TECHNICAL FIELD

The present invention relates to a light source device used as a backlight of a liquid crystal display device for example, and to a display device using the same.

The present application is based on and claims priority from Japanese Patent Application No. 2007-316688 and No. 2008-140900, filed in Japan on Dec. 7, 2007 and May 29, 2008 respectively, the disclosures of which are hereby incorporated by reference.

BACKGROUND ART

In the past, there have been proposed various light source devices as backlights of liquid crystal display (LCD: Liquid Crystal Display) devices, which are used in liquid crystal display televisions, laptop personal computers, car navigation systems, etc. (for example, see Patent Documents 1 to 3). Each of the light sources described in these Patent Documents employs an edge light method utilizing a light guiding means. However, reduction in thickness and increase in area of the liquid crystal display devices are in progress in recent years, and development of a direct-under type light source, capable of achieving the reduction in thickness and the increase in area, has also been desired in the backlight mounted thereon.

Accordingly, a light source device illustrated in FIGS. 16(A) and (B) for example has been proposed as the direct-under type backlight. As illustrated in FIG. 16(A), this light source device arranges point sources of light 110, emitting a white light, on a substrate 100 at regular intervals, and arranges a diffusion plate 120 etc. thereabove, to allow a uniform surface light-emission.

As illustrated in FIG. 16(B), in the point source of light 110 described above, an insulant 112, an electrode 113, a thermal conductive bonding layer 114, and a sub-mount substrate 116 are arranged on a metal plate 111. A blue light emitting diode (LED: Light Emitting Diode) 117 as an excitation light source is formed on the sub-mount substrate 116. The blue light emitting diode 117 is connected to the electrode 113 via a bonding wire 115. In addition, a phosphor layer 118 is applied and formed so as to cover the blue light emitting diode 117. An entire body thereof is packaged by a seal layer 119. With this configuration, a blue light emitted from the blue light emitting diode 117 is converted into a red light and a green light, or into a yellow light in the phosphor layer 118, and thereby a white light is output by the point source of light 110 as a whole.

Patent Document 1: Japanese Unexamined Patent Application Publication No. 2003-100126
Patent Document 2: Japanese Unexamined Patent Application Publication No. 2003-222861
Patent Document 3: Japanese Unexamined Patent Application Publication No. 2001-23420

DISCLOSURE OF THE INVENTION

However, in the direct-under type light source device using the white point source of light described above, a phosphor should be applied on a surface of a tiny LED chip, which is approximately 1 mm or less in size. Therefore, there has been a problem that variation in application (unevenness in thickness) of the phosphor layer is generated among units, and thereby color unevenness occurs easily. Also, the phosphor layer easily deteriorates depending on the environment in each package, which has also been a factor of causing the color unevenness.

The present invention has been made in view of the above-described problem, and an object of the invention is to provide a light source device capable of suppressing generation of color unevenness, and a display device using the same.

A light source device according to the present invention includes: a light emitting section; and a color conversion layer provided to be opposed to the light emitting section at a distance, and converting part of color light in one wavelength region incident from the light emitting section into color light in another wavelength region, wavelength thereof being longer than that of the one wavelength region, thereby to output the color light in the another wavelength region as well as to transmit other part of the color light in the one wavelength region.

A display device according to the present invention includes: a display panel driven based on image data; and the light source device according to the present invention described above, which irradiates light toward the display panel.

In the light source device and the display device of the present invention, part of the color light in one wavelength region emitted from the light emitting section is converted by the color conversion layer into the color light in another wavelength region, and thereby color lights in a plurality of wavelength regions are output from each region of the color conversion layer, in the light source device. Here, the color conversion layer is provided to be spaced apart from the light emitting section and opposed to the light emitting section. Thus, fluctuation of intensity in each color light due to non-uniform application of the color conversion layer is difficult to occur as compared with a configuration in which a color conversion layer is formed adjacent to an excitement light source.

Here, since a light path length within the color conversion layer of light passing through the color conversion layer is uniform independent of an exit angle, the intensity of each color light exiting from the color conversion layer becomes uniform independent of the exit angle.

According to the light source device and the display device of the present invention, the color conversion layer, which converts part of each color light in one wavelength region emitted from the light emitting section into the color light in another wavelength region, is provided to be spaced apart from the light emitting section and opposed to the light emitting section, in the light source device. This makes it possible to suppress the fluctuation of intensity in each color light as compared with a configuration in which a color conversion layer is formed adjacent to an excitement light source. Therefore, it is possible to suppress generation of color unevenness.

BEST MODE FOR CARRYING OUT THE INVENTION

An embodiment of the present invention will be described in detail below with reference to the drawings.

[First Embodiment]

Figure 1:
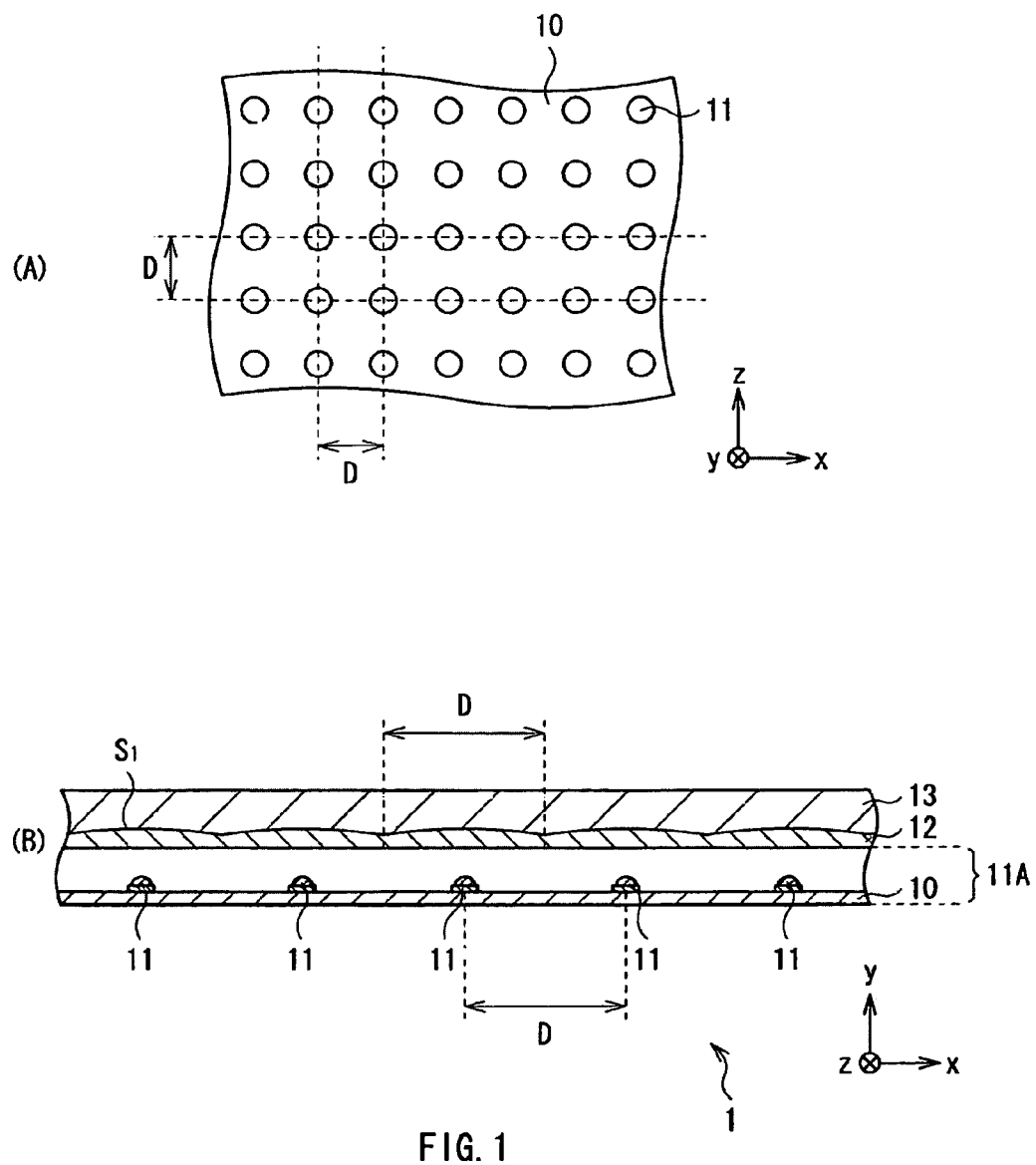
FIG. 1 illustrates a schematic configuration of a light source device according to a first embodiment of the present invention.

FIG. 1(A) is a z-x plan view illustrating a schematic configuration of a light source device (hereinafter referred to as a light source device 1) according to a first embodiment of the invention, and FIG. 1(B) is an x-y sectional view thereof. The light source device 1 is arranged with a plurality of excitement light sources within the same plane, and thereby performs surface light-emission as a whole. This light source device 1 is provided with a phosphor layer (color conversion layer) 12 and a diffusion layer 13, which are sequentially arranged in this order above a light emitting section 11A. The light emitting section 11A is arranged with a plurality of excitement light sources (point sources of light) 11, which are arranged on a substrate 10 at predetermined intervals D. Incidentally, each of the first embodiment to a third embodiment to be described below is a configuration example in which the plurality of point sources of light are arranged on the same plane. Also, in these configuration examples, it is assumed that a distance between the substrate 10 on which the excitement light sources 11 are arranged and the phosphor layer 12, and the intervals among the plurality of excitement light sources 11, are appropriately adjusted, and that intensity of each light emitted from one excitement light source 11 itself is mutually equal.

The substrate 10 is configured of a printed circuit board for example, and is arranged at the bottom of a body of the light source device 1.

The excitement light source 11 is a light source which emits an excitement light of the phosphor layer 12 to be described later, and is configured of an element emitting a color light having a comparatively short wavelength region, which is, for example, a blue light emitting diode, an ultraviolet emitting diode, and so forth. However, it is preferable that the blue light emitting diode be used, in terms of an output and a color conversion efficiency in the phosphor layer 12. In the present embodiment, a case will be described hereinafter where the blue light emitting diode is used as the excitement light source 11.

The phosphor layer 12 is arranged to be spaced apart from the excitement light source 11 so as to oppose the substrate 10, and converts part of the color light emitted from the excitement light source 11 into a color light in a longer wavelength region. The phosphor layer 12 is arranged to be substantially parallel along the substrate 10 of the light emitting section 11A. Also, a light exit surface of the phosphor layer 12 has a concave-convex shape corresponding to the arrangement of the excitement light sources 11. A detailed configuration of the phosphor layer 12 will be described later.

The diffusion layer allows a uniform surface light-emission by diffusing the light output from the phosphor layer 12. The diffusion layer 13 is arranged adjacent to the phosphor layer 12 along the light exit surface of the phosphor layer 12, for example.

Figure 2:
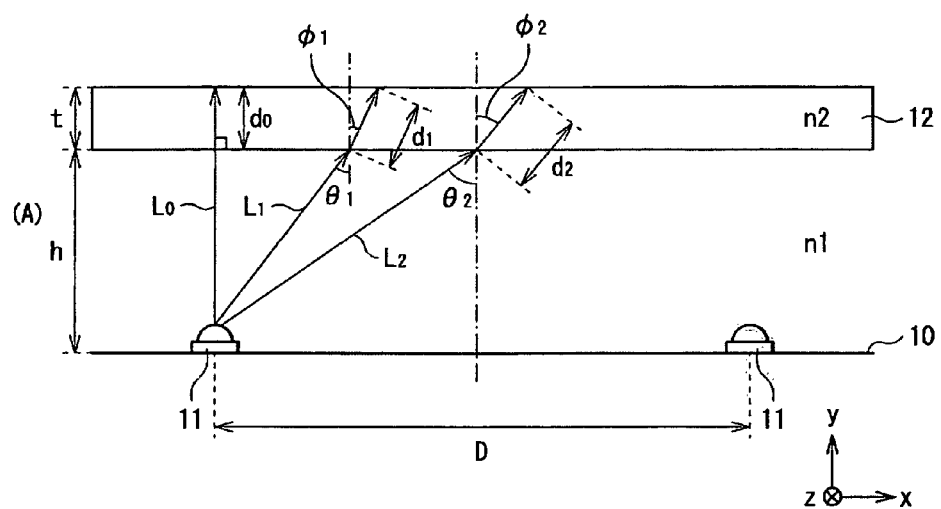
FIG. 2 is a view for explaining a shape of a curved surface of a phosphor layer illustrated in FIG. 1.
Figure 2:
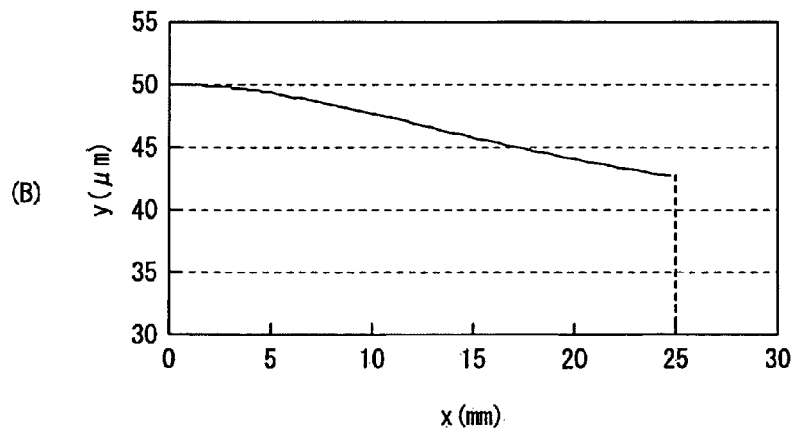

Next, the detailed configuration of the phosphor layer 12 will be described with reference to FIG. 1(B), and FIGS. 2(A) and (B). FIGS. 2(A) and (B) are drawings for explaining a shape of the surface of the phosphor layer 12.

In the phosphor layer 12, a light incident surface is flat, and the light exit surface is formed as a curved surface S1 which is convex on the light exit side (hereinafter simply referred to as a convex curved surface) for each region corresponding to each of the excitement light sources 11. The convex curved surface S1 of the phosphor layer 12 is designed as follows. For example, as illustrated in FIG. 2(A), when a refractive index of an air layer between the substrate 10 and the phosphor layer 12 is n1, a thickness thereof is h, a refractive index of the phosphor layer 12 is n2, and a thickness thereof is t, a light $L_0$ emitted from one excitement light source 11 and to be incident vertically on the phosphor layer 12 passes through the phosphor layer 12 without being refracted, so that a light path length is $d_0$ (=t). On the other hand, a light $L_1$ and a light $L_2$, which are incident on the phosphor layer 12 at an angle $\theta_1$ and an angle $\theta_2$, are refracted at a refraction angle $\phi_1$ and a refraction angle $\phi_2$ in the phosphor layer 12, so that light path lengths in the phosphor layer 12 are $d_1$, $d_2$, respectively. In this way, the convex curved surface S1 is designed, such that the light path lengths $d_0$, $d_1$, $d_2$, . . . of the lights passing through the phosphor layer 12 become uniform independent of exit angles from the phosphor layer 12. However, the term "uniform" is not limited to a case in which they are perfectly the same, but is a broad concept including a range in which color unevenness does not raise practical issues.

Specifically, when n1=1.0, n2=1.5, t=0.05 (mm), h=20 (mm), and D=50 (mm), the convex curved surface S1 is designed so that a curve illustrated in FIG. 2(B) is made within an x-y section. Incidentally, the larger the refractive index n2 of the phosphor layer 12 becomes, the nearer the incident light becomes to a vertical direction, and thereby the convex curved surface S1 makes a moderate curve with a small curvature.

When the blue light emitting diode is used for the excitement light source 11 for example, the phosphor layer 12 includes at least one kind the following phosphor materials. For example, as phosphor materials for a yellow conversion, there are $(Y, Gd)_3(Al, Ga)_5O_{12}:Ce^{3+}$ (commonly called YAG: Ce3+), $\alpha$-SiAlON:$Eu^{2+}$, and so forth. As phosphor materials for a yellow or a green conversion, there are (Ca, Sr, Ba)$_2$SiO$_4$:$Eu^{2+}$, and so forth. As phosphor materials for a green conversion, there are SrGa$_2$S$_4$:$Eu^{2+}$, $\beta$-SiAlON:$Eu^{2+}$, Ca$_3$Sc$_2$Si$_3$O$_{12}$:$Ce^{3+}$, and so forth. As phosphor materials for a red conversion, there are (Ca, Sr, Ba)S:$Eu^{2+}$, (Ca, Sr, Ba)$_2$Si$_5$N$_8$:$Eu^{2+}$, CaAlSiN$_3$:$Eu^{2+}$, and so forth. For example, by using the blue light emitting diode for the excitement light source 11, and by using the one in which the phosphor material for green conversion and the phosphor material for red conversion are included with an appropriate compounding ratio for the phosphor layer 12, the color lights of three primary colors of a red color (R: Red), a green color (G: Green), and a blue color (B: Blue) are output from the phosphor layer 12.

Also, the convex curved surface S1 of the phosphor layer 12 described above can be formed as follows. For example, it can be formed by previously forming a concave-convex shape, which corresponds to the convex curved surface S1, on one surface of the diffusion layer 13 which is arranged on the light exit side of the phosphor layer 12, and applying the phosphor material described above on a surface formed with the concave-convex shape so that an outermost surface (a surface located on the light incident side) becomes smooth.

Figure 3:
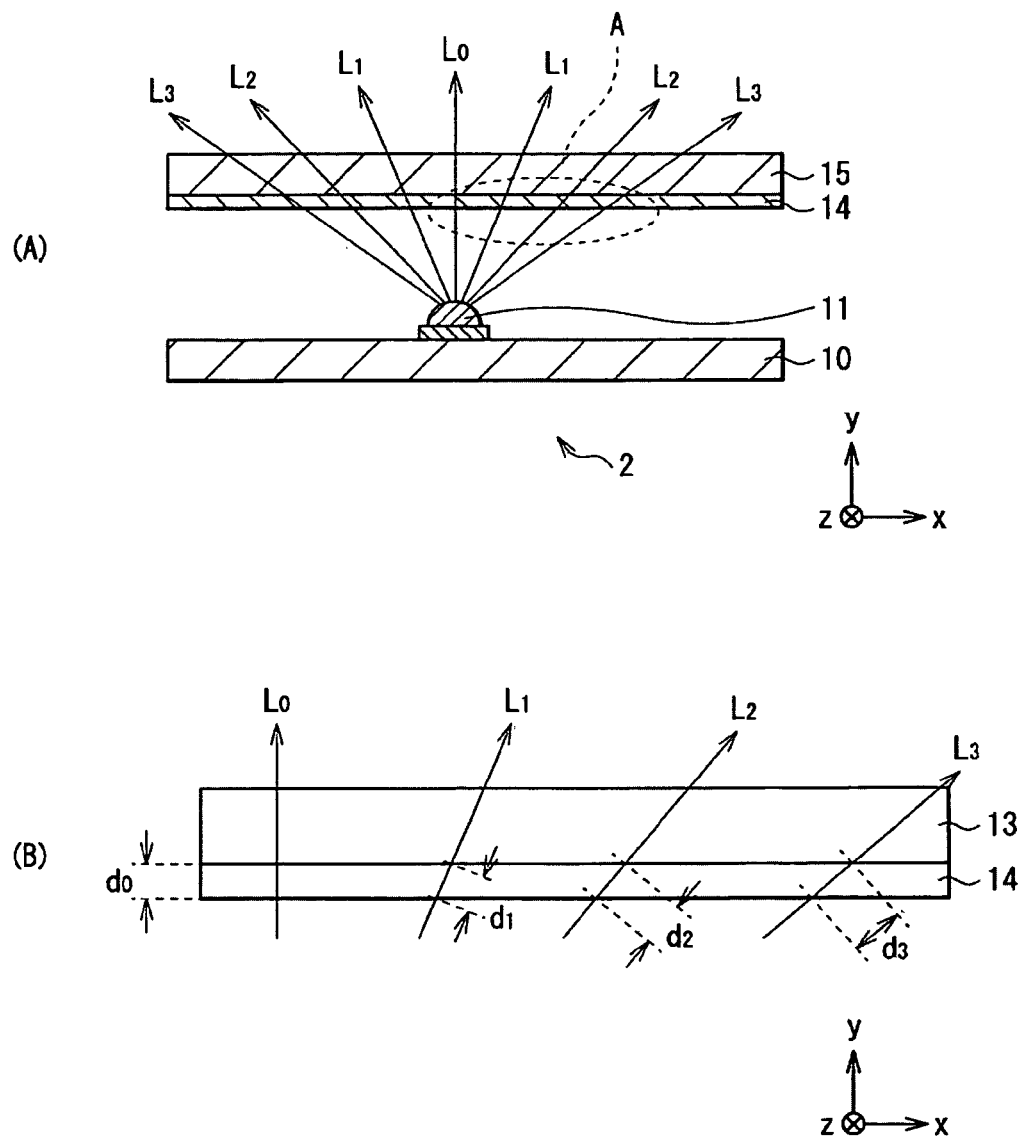
FIG. 3 is a view for explaining operation of the light source device illustrated in FIG. 1.
Figure 4:
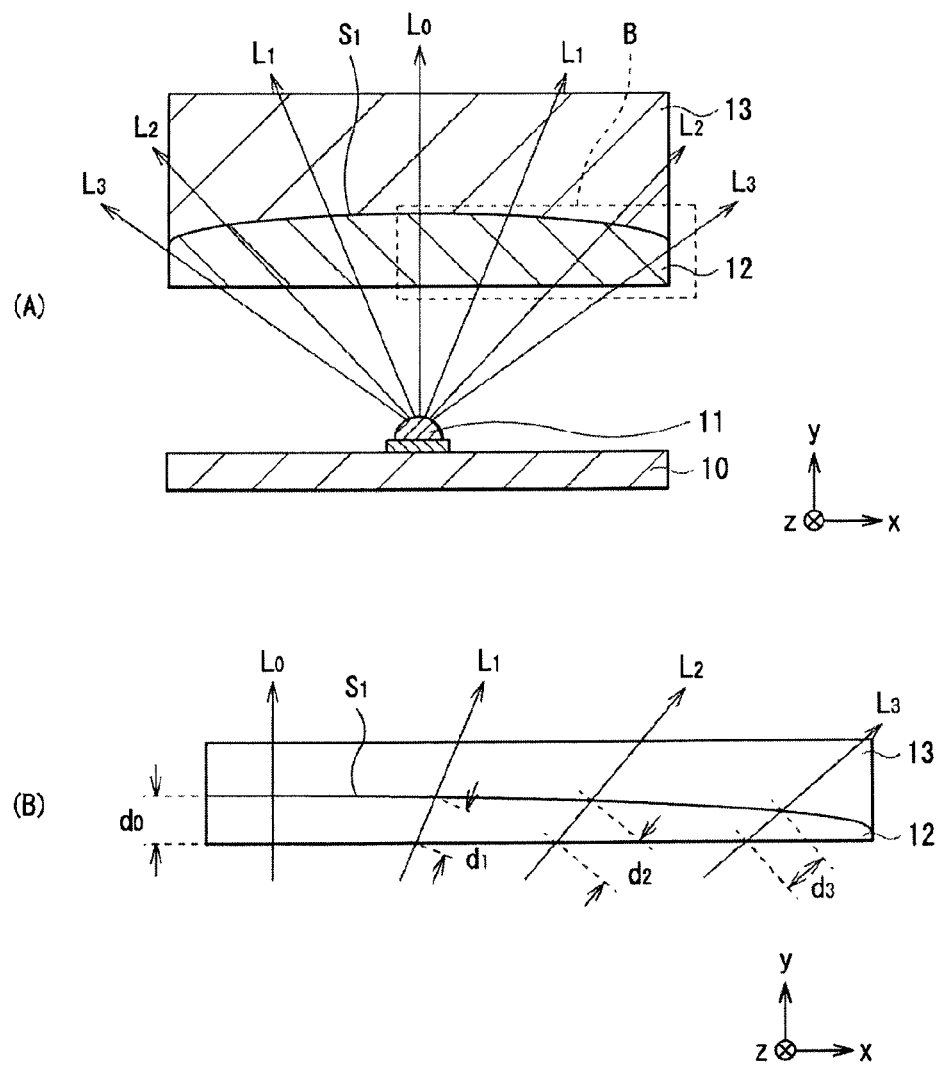
FIG. 4 is a view for explaining the operation of the light source device illustrated in FIG. 1.

Next, operation and effect of the light source device 1 described above will be described with reference to FIG. 1 to FIG. 4. FIG. 3(A) is a sectional view illustrating a schematic configuration of a light source device 2 provided with a phosphor layer in which both surfaces thereof are flat, and FIG. 3(B) is an enlarged view of a region A in the (A) drawing. FIG. 4(A) is a sectional view illustrating the schematic configuration of the light source device 1 according to the present embodiment, and FIG. 4(B) is an enlarged view of a region B in the (A) drawing.

In the light source device 1, when each of the blue lights emitted from the plurality of excitement light sources 11, which are arranged at the predetermined intervals D on the substrate 10, is incident on the phosphor layer 12, a part thereof is converted into a red light and a green light, which are then output therefrom. Accordingly, the color lights of the three colors of R, G, and B are output from each of the regions of the phosphor layer 12, and thereby a white surface light-emission as a whole is produced. Then, the color lights of the three colors output from the phosphor layer 12 are uniformly diffused by the diffusion layer 13.

Figure 12:
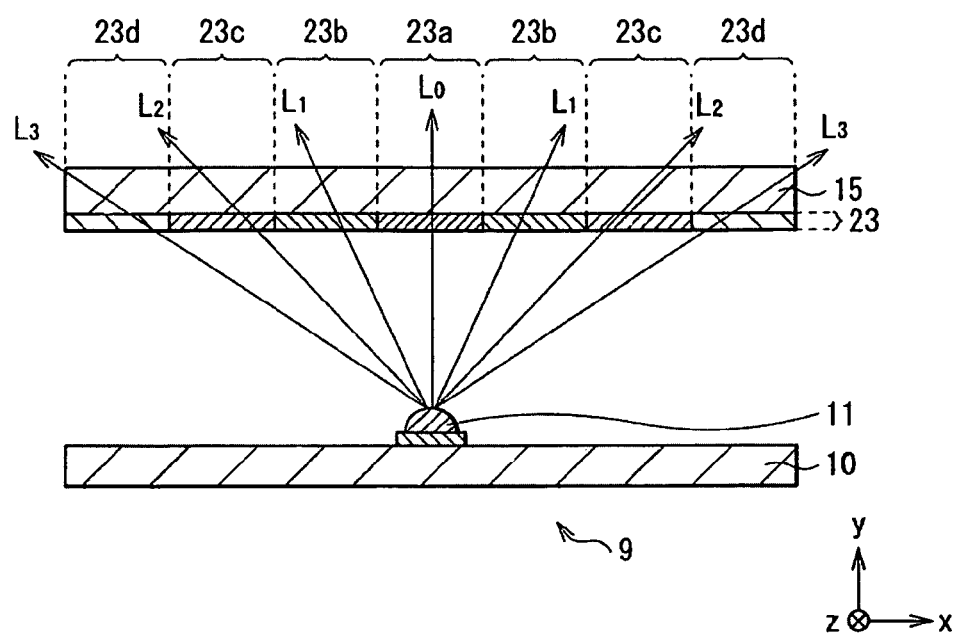
FIG. 12 is a sectional view illustrating a schematic configuration of a light source device according to a third embodiment of the present invention.

In a light source device in the past illustrated in FIG. 12, each point source of light 110 has a configuration in which a phosphor layer 118 is applied and formed on a surface of a blue light emitting diode 117 as an excitement light source, and an entire body thereof is packaged by a seal layer 119. That is, the phosphor layer 118 is formed adjacent to the excitement light source, for each of the point sources of light 110. Generally, a size of a blue emitting light diode chip is approximately 1 mm or less, so that it is extremely difficult to apply a phosphor material uniformly on such a tiny area, and variation among units occurs easily as well. Thus, nonuniform application of the phosphor layer 118 causes color unevenness in the light output from the phosphor layer 118 to occur easily. Further, the phosphor layer 118 deteriorates easily by an influence of the environment within the package, and this has also been a factor of causing the color unevenness.

Accordingly, as in the light source device 2 illustrated in FIG. 3(A), by separating a flat-plate phosphor layer 14 away from the excitement light sources 11, and arranging the same, as a common layer, so as to oppose the substrate 10 relative to the plurality of excitement light sources 11, the influence due to the nonuniform application of the phosphor layer is less affected as compared with the configuration in the past described above. Therefore, it is possible to suppress the generation of the color unevenness attributed, in particular, to the nonuniform application of the phosphor layer in the direct-under type light source device, more than ever before.

On the other hand, when the phosphor layer 14, in which the both surfaces thereof are flat, is provided to be separated apart from the excitement light source 11 and opposed the substrate 10 as described above, differences among the light path lengths $d_0$, $d_1$, $d_2$, $d_3$, . . . in the phosphor layer 14 are generated in lights $L_0$, $L_1$, $L_2$, and $L_3$ emitted in the directions of different angles from the excitement light source 11, as illustrated in FIG. 3(B). Here, in a region where the light path length is short (an incident angle to the phosphor layer 14 is small), a blue color becomes strong since an amount of color conversion becomes relatively small. In contrast, in a region where the light path length is long (the incident angle to the phosphor layer 14 is large), a yellow color (a red and a green color) becomes strong since the color conversion amount becomes relatively large. That is, a variation in a color conversion efficiency of the exiting light to the incident light in the phosphor layer 12 occurs depending on positions within the region corresponding to the excitement light source 11. In other words, a rate of the color light to be converted varies depending on the angle direction of the light incident on the phosphor layer 14. Thereby, fluctuation in intensity of each of the color lights is generated in accordance with the exit angle from the phosphor layer 14, leading to the generation of the color unevenness.

Therefore, in the present embodiment, the light exit surface of the phosphor layer 12 has the convex curved surface S1 for each of the excitement light sources 11, and is designed such that a light path length ($d_4$) within the phosphor layer 14 is uniform in the lights $L_0$, $L_1$, $L_2$, and $L_3$ emitted from the excitement light source 11, as illustrated in FIGS. 4(A) and (B). Thus, the intensity of the color lights of the three colors becomes uniform on the surface as a whole, independent of the exit angle from the phosphor layer 12.

As described in the foregoing, in the light source device 1, the phosphor layer 12 is provided so as to be spaced apart from the plurality of excitement light sources 11 and oppose the substrate 10, and the light exit surface of the phosphor layer 12 is adapted to have the curved surface which is convex on the light exit side for each of the regions corresponding to the excitement light sources 11. This makes it possible to allow the color conversion efficiency of the exiting light with regard to the incident light in the phosphor layer 12 to be uniform, irrespective of the positions within the region corresponding to the excitement light source 11. In other words, this makes it possible to allow the intensity of the three colors to be uniform, independent of the exit angle from the phosphor layer 12. Therefore, in comparison with the light source device 2 provided with the phosphor layer in which both surfaces thereof are flat, it is possible to suppress the color unevenness which occurs depending on the angle directions of the lights output from the phosphor layer 12, in particular.

Figure 5:
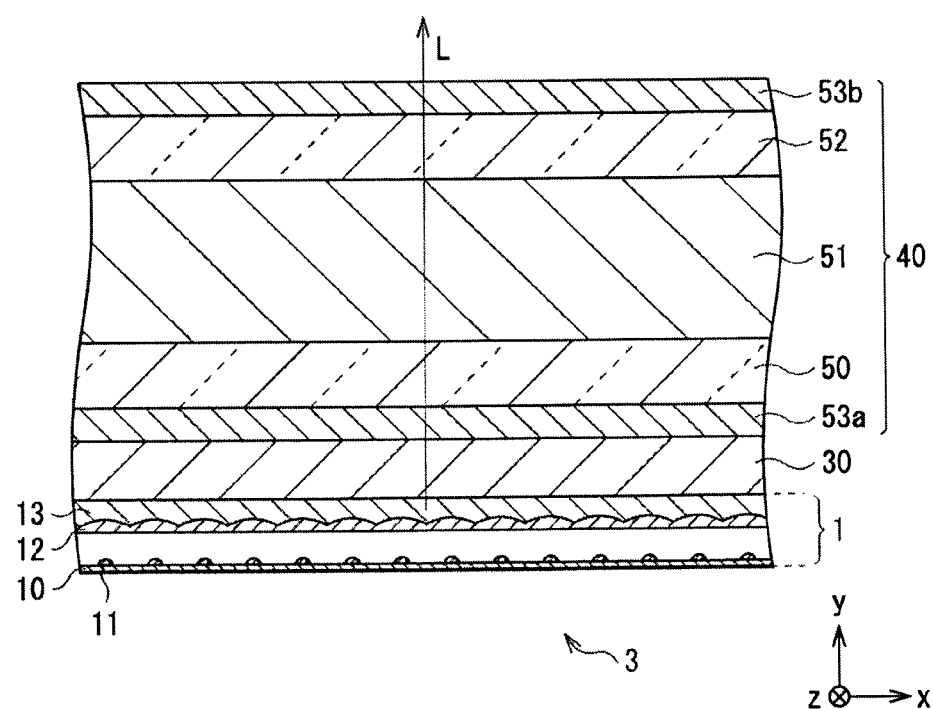
FIG. 5 is a sectional view illustrating a schematic configuration of a liquid crystal display device according to an application example of the light source device illustrated in FIG. 1.

Also, the light source device 1 as described above is used suitably for a backlight of a liquid crystal display device 3 illustrated in FIG. 5. FIG. 5 is a sectional view illustrating a schematic configuration of the liquid crystal display device 3. In the liquid crystal display device 3, an optical functional layer 30 and a liquid crystal display panel 40 are arranged on the light exit side of the light source device 1, for example. In the liquid crystal display panel 40, a liquid crystal layer 51 is sealed between a TFT substrate 50, on which pixel electrodes, TFT (Thin Film Transistor) elements, etc. (not illustrated) are formed, and a CF substrate 52, on which counter electrodes, color filters, etc. (not illustrated) are formed, for example. Also, in the liquid crystal display panel 40, polarizers 53$a$ and 53$b$ are attached to the light incident side and the light exit side, respectively, so that polarization of the incident lights to the panel and the exiting lights are controlled. The optical functional layer 30 is configured of various optical sheets, such as prism sheets, diffusion sheets, polarization collection sheets, and so forth.

In such a liquid crystal display device 3, when a drive voltage is applied between the TFT 50 substrate and the CF substrate 52 based on image data, a white light L output from the light source device 1 passes through the optical functional layer 30, and then enters the liquid crystal display panel 40, and is modulated by the liquid crystal layer 51, so that various image displays are performed. Here, since the direct-under type light source device 1 is provided as the backlight, it is possible to display an image of high quality in which the color unevenness and brightness unevenness are suppressed.

Next, modifications of the present embodiment will be described with reference to FIG. 6 to FIG. 9. Note that elements similar to those in the above embodiment are hereinafter attached with the same numerals, and description thereof will be appropriately omitted. Also, for simplification purpose, only a region corresponding to one excitement light source will be represented.

(Modification 1)

Figure 6:
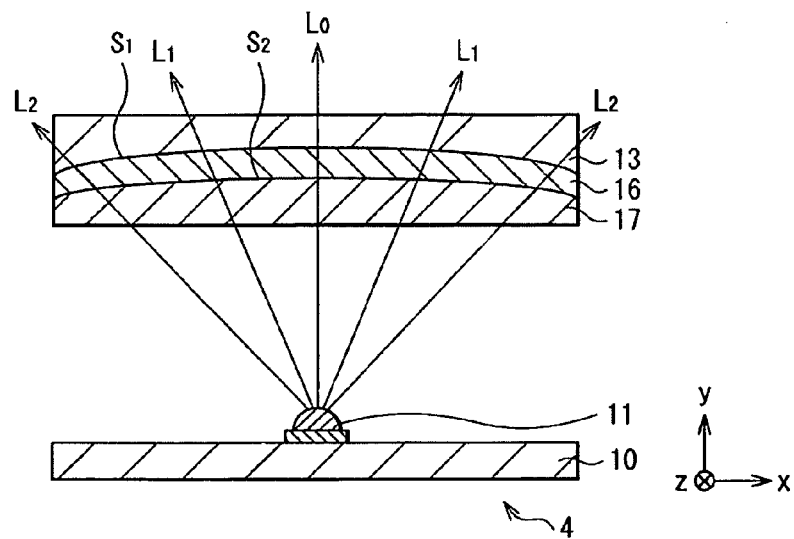
FIG. 6 is a sectional view illustrating a schematic configuration of a light source device according to Modification 1 of the first embodiment.

FIG. 6 is a sectional view illustrating a schematic configuration of a light source device 4 according to Modification 1 of the present embodiment. In the light source device 4, a configuration is similar to that of the light source device 1 described above, except that a light incident surface of a phosphor layer 16 has a curved surface S2 which is concave on the light incident side (hereinafter simply referred to as a concave curved surface), and a base film (transparent substrate) 17 is provided adjacent to the concave curved surface S2. However, the light source device 4 is configured such that a light path length within the phosphor layer 16 becomes uniform by a combination of the convex curved surface S1 and the concave curved surface S2.

The phosphor layer 16 can be formed, for example, as follows. First, as described above, the base film 17 is prepared separately from the diffusion layer 13 previously formed with the concave-convex shape which corresponds to the convex curved surface S1, and a concave-convex shape corresponding to the concave curved surface S2 is formed on the base film 17. Next, the phosphor material described above is applied on the concave-convex surface of the diffusion layer 13, and thereafter, the phosphor material is sandwiched inbetween in such a manner as to press the concave-convex surface of the base film 17. Thereby, it is possible to form the phosphor layer 16, having the convex curved surface S1 on the light exit surface and the concave curved surface S2 on the light incident surface.

Therefore, even with the configuration in which the convex curved surface S1 is formed on the light exit surface and the concave curved surface S2 is formed on the light incident surface, it is possible to obtain an effect which is similar to that of the light source device 1 described above. Also, the using of the base film makes it possible to form a desired curved surface shape with ease.

(Modification 2)

Figure 7:
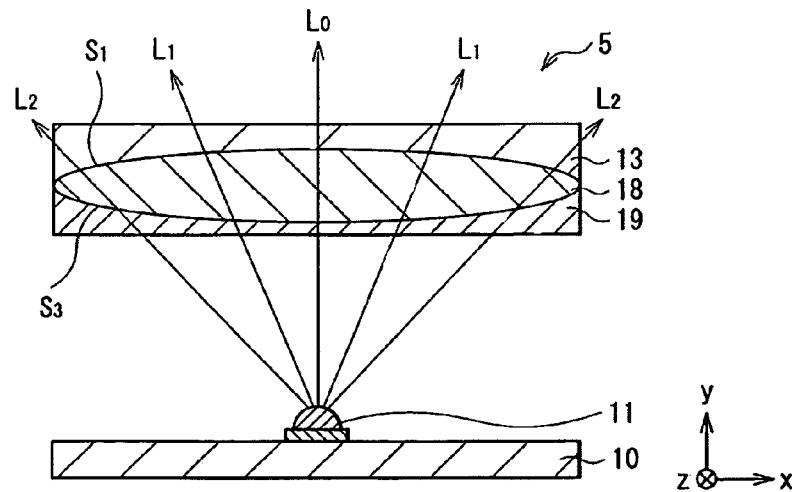
FIG. 7 is a sectional view illustrating a schematic configuration of a light source device according to Modification 2 of the first embodiment.

FIG. 7 is a sectional view illustrating a schematic configuration of a light source device 5 according to Modification 2 of the present embodiment. In the light source device 5, a configuration is similar to that of the light source device 1 described above, except that a light incident surface of a phosphor layer 18 has a curved surface S3 which is convex on the light incident side (hereinafter simply referred to as convex curved surface), and a base film 19 is provided adjacent to the curved surface S3. Also, it has the configuration similar to that of the Modification 1 described above, except that a surface on the light incident side of the phosphor layer 18 has the convex curved surface S3. A curved surface shape thereof can be formed with a procedure similar to that of the Modification 1. Accordingly, even with the configuration in which the convex curved surface S1 is formed on the light exit surface of the phosphor layer 18 and the convex curved surface S3 is formed on the light incident surface thereof, it is possible to obtain effects which are similar to those of the light source device 1 and the light source device 4 described above.

(Modification 3)

Figure 8:
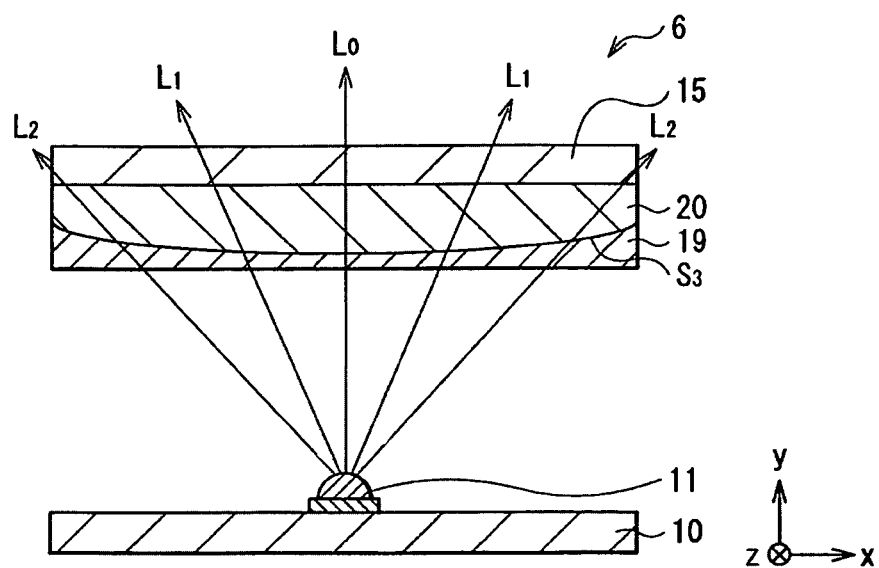
FIG. 8 is a sectional view illustrating a schematic configuration of a light source device according to Modification 3 of the first embodiment.

FIG. 8 is a sectional view illustrating a schematic configuration of a light source device 6 according to Modification 3 of the present embodiment. In the light source device 6, a configuration is similar to that of the light source device 1 described above, except that a light exit surface of a phosphor layer 20 is plane, a light incident surface has the convex curved surface S3 for each of the excitement light sources 11, and the base film 19 is provided adjacent to the curved surface S3. However, the light source device 6 is configured such that a light path length within the phosphor layer 20 becomes uniform by the convex curved surface S3 on the light incident side. Such a phosphor layer 20 can be formed by sandwiching the phosphor material described above between a diffusion layer 15 having a smooth surface and the base film 19 previously formed with a concave-convex shape corresponding to the convex curved surface S3. Accordingly, even with the configuration in which the convex curved surface S3 is formed on the light incident surface of the phosphor layer 20, it is possible to obtain effects which are similar to those of the light source devices 1, 4, and 5 described above.

(Modification 4)

Figure 9:
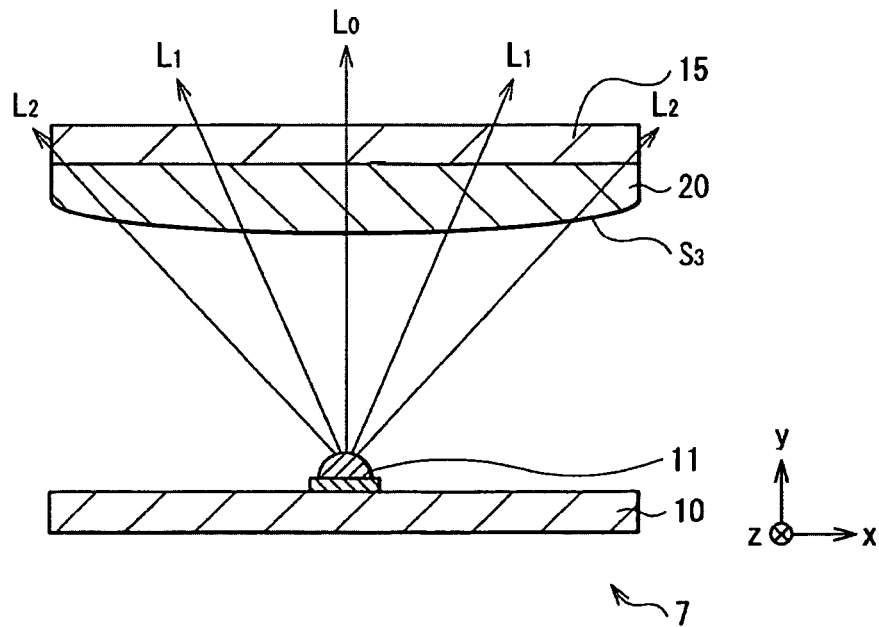
FIG. 9 is a sectional view illustrating a schematic configuration of a light source device according to Modification 4 of the first embodiment.

FIG. 9 is a sectional view illustrating a schematic configuration of a light source device 7 according to Modification 4 of the present embodiment. In the light source device 7, a configuration is similar to that of the light source device 1 described above, except that the light exit surface of the phosphor layer 20 is plane, and the light incident surface has the convex curved surface S3 for each of the excitement light sources 11. In this case, the convex curved surface S3 of the phosphor layer 20 can be formed by varying an amount of application of the phosphor material, in each region, for the diffusion layer 15 having the smooth surface, using a screen printing method or an ink-jet method, for example. Even with such a configuration, it is possible to obtain an effect similar to that of the light source device 1 described above. Also, since the phosphor layer can be formed without using the base film, it is possible to reduce the number of component parts as compared with the light source device 6 described above.

[Second Embodiment]

Figure 10:
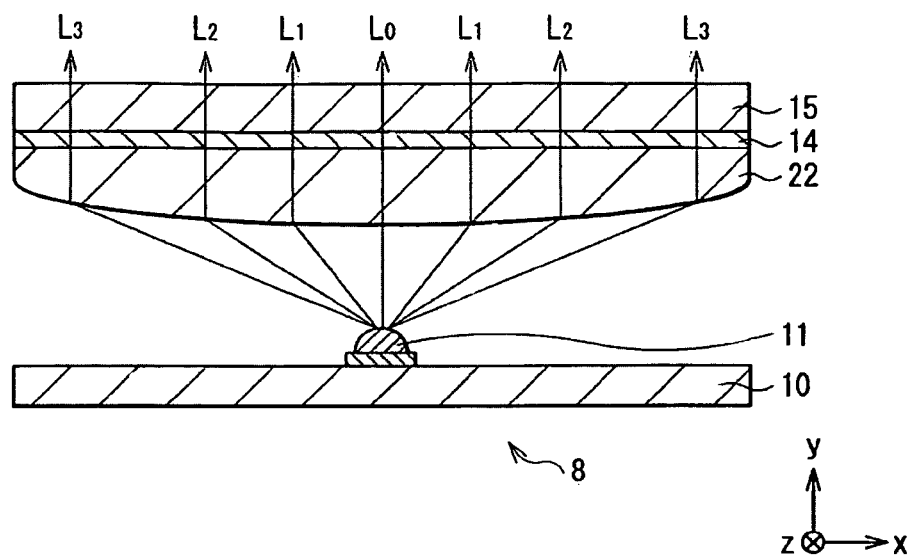
FIG. 10 is a sectional view illustrating a schematic configuration of a light source device according to a second embodiment of the present invention.

FIG. 10 is an x-y sectional view illustrating a schematic configuration of a light source device 8 according to a second embodiment of the present invention. Note that elements similar to those in the above embodiment are hereinafter attached with the same numerals, and description thereof will be appropriately omitted. Also, for simplification purpose, only a region corresponding to one excitement light source will be represented.

The light source device 8 has a configuration similar to that of the light source device 1 of the first embodiment described above, except that the phosphor layer 14 and the diffusion layer 15 are in flat-plate shape, and that a lens layer 22 is provided on the light incident side of the phosphor layer 14. The phosphor layer 14 is configured of the phosphor material similar to that of the phosphor layer 12 in the light source device 1 described above.

The lens layer 22 refracts the lights $L_0, L_1, L_2, L_3 \ldots$ emitted from the excitement light source 11 to raise the same in a y-direction, such that they are incident almost vertically on the phosphor layer 14. The lens layer 22 is structured by a spherical lens, an aspheric lens, or a diffractive lens, which is convex on the light incident side, for example.

Accordingly, the lens layer 22 is provided on the light incident side of the phosphor layer 14. Thus, the lights emitted from the excitement light source 11 are so refracted and raised as to be incident almost vertically on the phosphor layer 14. Thereby, the color conversion efficiency of the exiting light to the incident light in the phosphor layer 12 becomes uniform independent of the positions within the region corresponding to the excitement light source 11. In other words, the light path length within the phosphor layer 14 becomes uniform independent of an incident angle of the light from the excitement light source 11, and thus the fluctuation in the intensity of each of the color lights is less likely to occur in each position in the phosphor layer 14. Therefore, it is possible to obtain an effect equivalent to that of the optical device 1 of the first embodiment described above.

(Modification 5)

Figure 11:
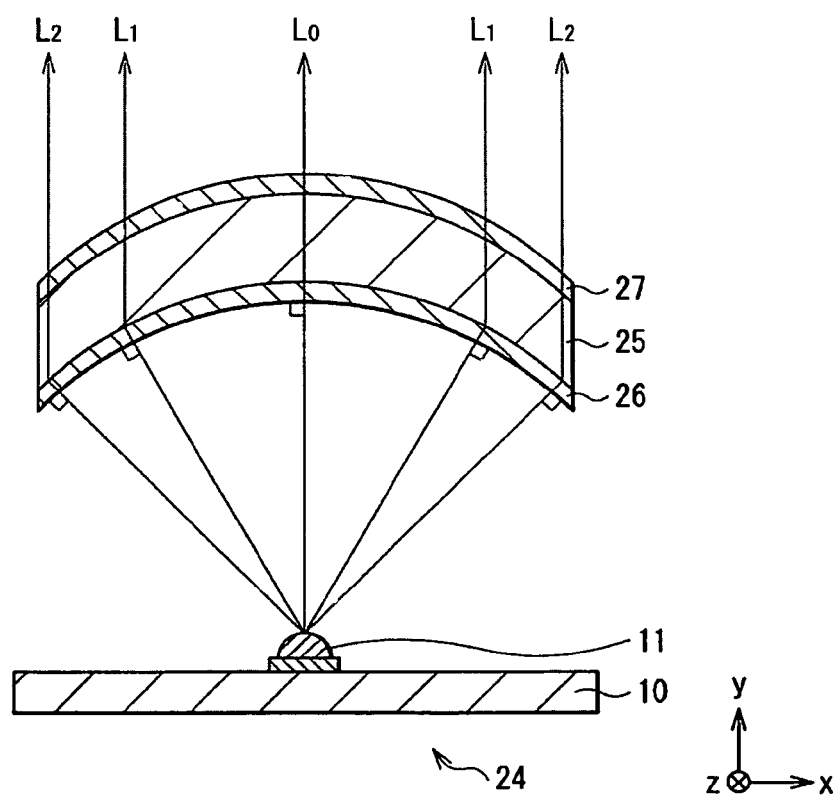
FIG. 11 is a sectional view illustrating a schematic configuration of a light source device according to Modification 5 of the second embodiment.

FIG. 11 is an x-y sectional view illustrating a schematic configuration of a light source device 24 according to Modification 5 of the second embodiment described above. In the light source device 24, a lens layer 25 is provided for each of the excitement light sources 11 located on the substrate 10, and a phosphor layer 26 and a diffusion layer 27 are provided on a light incident side and on a light exit side, respectively, of the lens layer 25. The phosphor layer 26 has a curved surface shape which is concave on the light incident side and is formed in a uniform thickness, for each region corresponding to the excitement light source 11. The lens layer 25 is provided along the curved surface shape of the phosphor layer 26 on the light exit side of the phosphor layer 26, and the respective lights $L_0, L_1, L_2, \ldots$ from the excitement light source 11 are refracted in a direction in which they are parallel one another. Also, each of the lights $L_0, L_1, L_2, \ldots$ from the excitement light source 11 is incident vertically on a surface of the phosphor layer 26 by the curved surface shape of the phosphor layer 26.

Accordingly, the lens layer 25 may be provided on the light exit side of the phosphor layer 26. Even in such a case, it is possible to obtain an effect similar to that of the second embodiment described above. Also, here, since the phosphor layer 26 has the curved surface shape which is concave on the light incident side and is formed in the uniform thickness, each of the lights $L_0, L_1, L_2, \ldots$ from the excitement light source 11 is incident vertically on the surface of the phosphor layer 26, and the light path length (passage distance) of each of the lights $L_0, L_1, L_2, \ldots$ within the phosphor layer 26 becomes mutually equal. Thus, the color conversion efficiency of the exiting light to the incident light becomes uniform independent of the positions within the region corresponding to the excitement light source 11. Therefore, it is possible to effectively suppress the generation of the color unevenness.

[Third Embodiment]

FIG. 12 is an x-y sectional view illustrating a schematic configuration of a light source device 9 according to the third embodiment of the present invention. Note that elements similar to those in the above embodiments are hereinafter attached with the same numerals, and description thereof will be appropriately omitted. Also, for simplification purpose, only a region corresponding to one excitement light source will be represented.

The light source device 9 has a configuration similar to that of the light source device 8 of the second embodiment described above, except for a phosphor layer 23. The phosphor layer 23 is in a flat-plate shape, and the color conversion efficiency per unit-passage distance of the light passing through the phosphor layer 23 for each of the positions within the region corresponding to the respective excitement light sources, is different according to the positions within the region corresponding to the excitement light source 11. Specifically, it is configured such that concentration of the phosphor material (the number of particles per unit volume) becomes different. For example, it is configured such that the concentration is lowered (the color conversion efficiency is small) in a stepwise fashion in sub-regions 23a, 23b, 23c, and 23d, which are from a central portion to an end portion in the region corresponding to the excitement light source. For the phosphor material structuring the phosphor layer 23, a phosphor material similar to that of the phosphor layer 12 in the first embodiment described above can be used.

Accordingly, in the phosphor layer 23, the concentration of the phosphor material is varied for each of the positions in the region corresponding to each of the excitement light sources. Thereby, an amount of color conversion in each of the positions of the phosphor layer 23 becomes uniform, and the intensity of each of the color lights becomes uniform independent of an exit angle from the phosphor layer 23. Therefore, it is possible to obtain an effect equivalent to that of the optical device 1 of the first embodiment described above.

[Embodiment 4]

Figure 13:
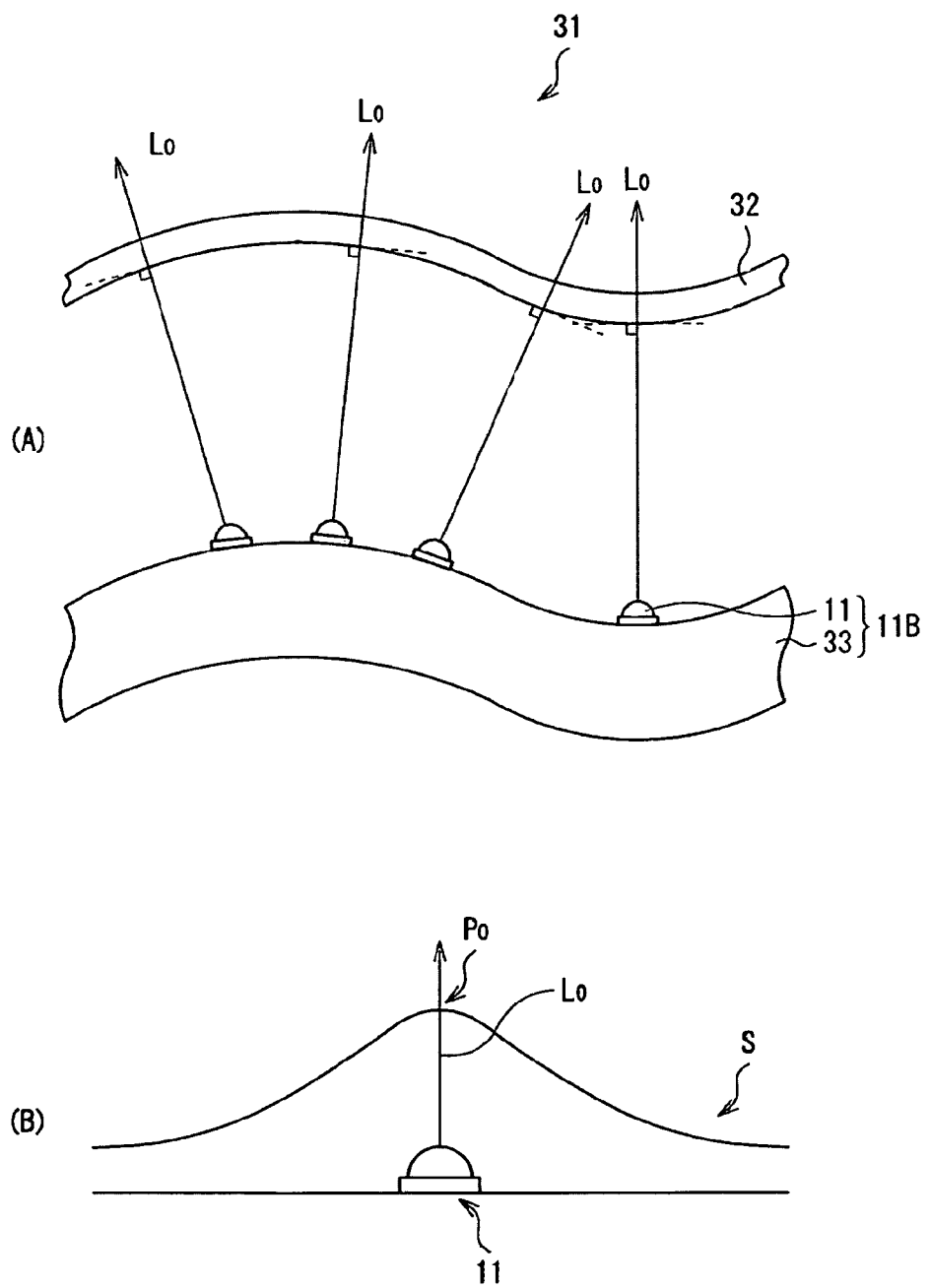
FIG. 13 is a sectional view illustrating a schematic configuration of a light source device according to a fourth embodiment of the present invention.

FIG. 13(A) illustrates a schematic configuration of a light source device 31 according to the fourth embodiment of the present invention. Note that elements similar to those in the above embodiments are hereinafter attached with the same numerals, and description thereof will be appropriately omitted.

The light source device 31 is arranged with a phosphor layer 32, which is spaced apart from a light emitting section 11B. The light emitting section 11 is arranged with the plurality of excitement light sources 11 on a support 33 having a curved surface shape. The phosphor layer 32 is formed along the curved surface shape of the support 33. However, in the present embodiment, a light emitted from one excitement light source 11 has such an intensity distribution S illustrated in FIG. 13(B). The phosphor layer 32 is configured such that a light (central light) $L_0$, an intensity of which is the maximum (peak $P_0$) in the intensity distribution S, is incident vertically on a surface of the phosphor layer 32. A concrete example of the present embodiment will be explained below.

Figure 14:
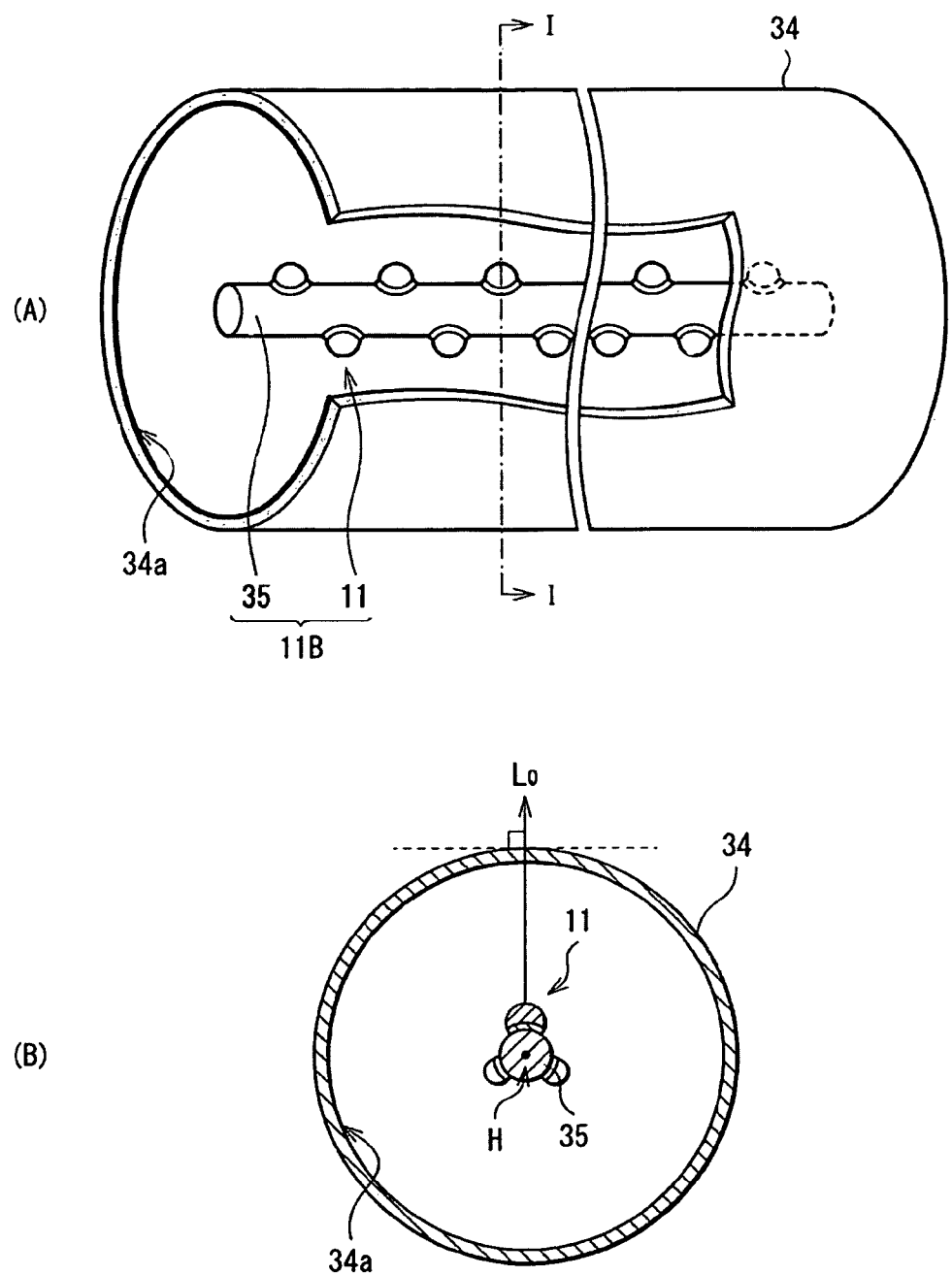
FIG. 14 is a sectional view illustrating a schematic configuration of a light source device according to a concrete example of the fourth embodiment.

FIG. 14(A) illustrates one concrete example of the light source device 31 according to the fourth embodiment. FIG. 14(B) is a sectional view taken along a line I-I as viewed in an arrow direction in FIG. 14(A). In the present example, the light emitting section 11B disposes the plurality of excitement light sources 11 on a surface of the rod-like support 35 at predetermined intervals, and a tubular fluorescent tube 34 is provided so as to cover the light emitting section 11B. Such a light source device can also be suitably used for lighting devices such as fluorescent lamps, for example.

A surface shape of the support 35 of the light emitting section 11B and a surface shape of the fluorescent tube 34 is formed as a curved surface body. For example, as illustrated also in FIG. 14(B), the support 35 of the light emitting section 11B has a columnar shape, and the fluorescent tube 34 has a cylindrical shape, which is concentric (center H) to the support 35. Thereby, the light $L_O$ output from one excitement light source 11 enters the fluorescent tube 34 along a normal line direction of a contact surface of the fluorescent tube 34. A phosphor layer 34a, which is configured of the phosphor material described above, is formed inside of the fluorescent tube 34 at a uniform thickness. Incidentally, the diffusion layer described above may be provided along the shape of the fluorescent tube 34 on the inside or the outside of the fluorescent tube 34.

Accordingly, the phosphor layer 34a is disposed to be spaced apart from the light emitting section 11B, and is provided as a common layer for the plurality of excitement light sources 11. Thus, in comparison with a case in the past where a phosphor layer is applied and formed for each of the excitement light sources, it is possible to suppress the occurrence of the color unevenness attributed to the nonuniform application of the phosphor layer. Also, the light $L_O$, the intensity of which is the maximum among the lights emitted from the excitement light source 11, is incident vertically on the phosphor layer 34a formed at the uniform thickness. Thus, the light path length within the phosphor layer 34a of the light $L_O$ from each of the excitement light sources 11 becomes equal mutually. Therefore, it is possible to allow the color conversion efficiency to be uniform in the intensity peak of the light emitted from each of the excitement light sources 11, and to effectively suppress the occurrence of the color unevenness attributed to arrangement of the excitement light sources 11.

(Modification 6)

Figure 15:
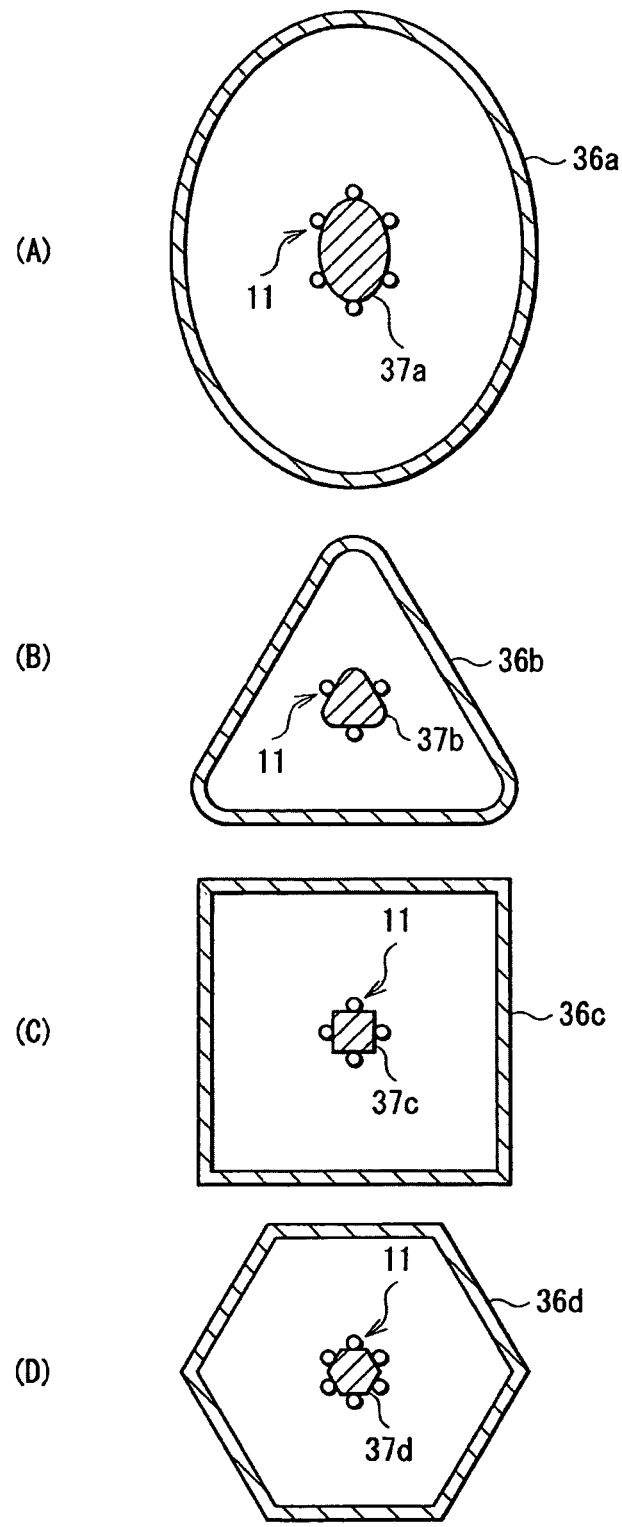
FIG. 15 is a sectional view illustrating a schematic configuration of a modification of the light source device illustrated in FIG. 14.
Figure 16:
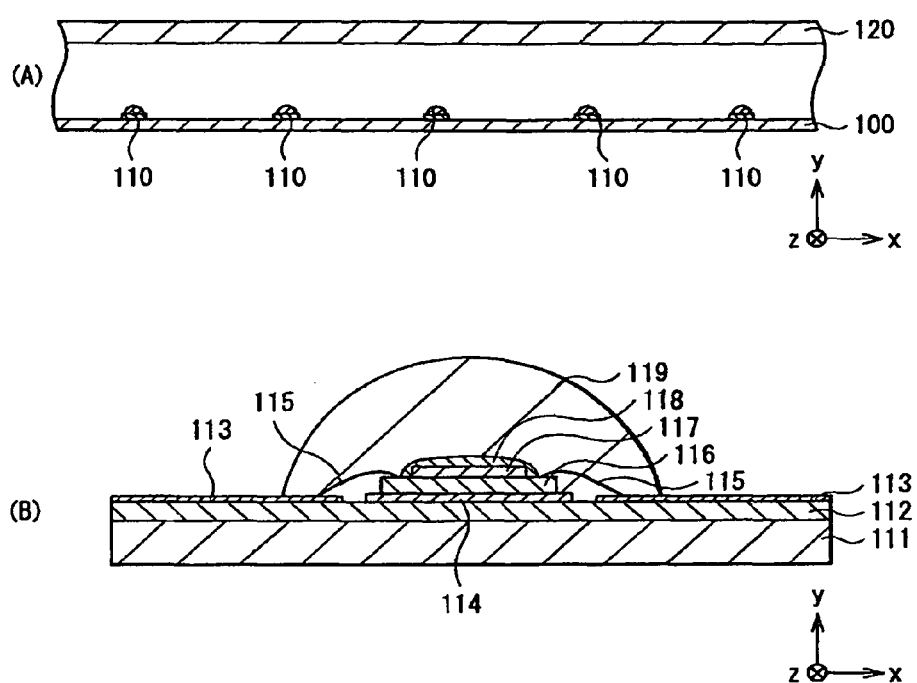
FIG. 16 is a sectional view illustrating a schematic configuration of a light source device according to an example in the past.

In the fourth embodiment described above, the configuration of the light emitting portion and the fluorescent tube is not limited to the columnar or the cylindrical shape. For example, it may be a configuration in which a support 37a having an elliptic columnar shape and a fluorescent tube 36a having an elliptic cylindrical shape are combined (FIG. 15(A)), or may be a configuration in which a support 37b having a substantially triangular prism shape in which a top portion thereof is round, and a fluorescent tube 36b having a substantially triangular tube shape are combined (FIG. 15(B)). Further, a configuration may be employed, where the one in which the plurality of excitement light sources are arranged on a surface of a spherical support is provided as a light emitting section, and where a phosphor layer having a spherical shape is configured to be concentric to the light emitting section so as to cover the light emitting section (not illustrated).

Also, the surface shape of the light emitting section and the surface shape of the fluorescent tube are not limited to the curved surface body, and may be a polyhedron. For example, it may be a configuration in which a support 37c having a square prism shape and a fluorescent tube 36c having a regular tetrahedral shape are combined (FIG. 15(c)), or may be a configuration in which support 37d having a hexagonal prism shape and a fluorescent tube 36d having a regular hexahedral shape are combined (FIG. 15(d)).

Although the embodiments of the present invention have been described above, the present invention is not limited to these embodiments, but allows various modifications. For example, although the description has been made with reference to the configuration as an example where the blue light emitting diode is used as the excitement light source and the phosphor layer, which performs the conversion into the green color light and the red color light, is used as the color conversion layer, a combination of the excitement light source and the color conversion layer is not limited thereto. For example, an ultraviolet light emitting diode may be used for the excitement light source. In this case, for the color conversion layer, (Ca, Sr, Ba)$_2$SiO$_4$:Eu$^{2+}$, BAM:Eu$^{2+}$, MN$^{2+}$, and α-SiAlON:Eu$^{2+}$, etc., can be used as phosphor materials for the green conversion or the yellow conversion. As phosphor materials for the red conversion, Y$_2$O$_2$S:Eu$^{3+}$, La$_2$O$_2$S:Eu$^{3+}$, (Ca, Sr, Ba)$_2$Si$_5$N$_8$:Eu$^{2+}$, CaAlSiN$_3$:Eu$^{2+}$, LiEuW$_2$O$_8$, Ca (Eu, La)$_4$Si$_3$O$_{13}$, Eu$_2$W$_2$O$_9$ based material, (La, Eu)$_2$W$_3$O$_{12}$, (Ca, Sr, Ba)$_3$MgSi$_2$O$_8$:Eu$^{2+}$, Mn$^{2+}$, CaTiO$_3$:Pr$^{3+}$, and Bi$^{3+}$, etc., can be used. Also, as phosphor materials for the blue conversion, BAM:Eu$^{2+}$, and (Ca, Sr, Ba)$_5$(PO$_4$)$_3$Cl:Eu$^{2+}$, etc., can be used.

Also, in the embodiments described above, although the description has been made with reference to the example, as the light emitting section, which performs the surface light-emission as a whole by arranging the plurality of excitement light sources on the substrate or on the support, it is not limited thereto. The surface light-emission may be performed using an organic EL light emitting element, or a light guiding member such as an optical fiber and a light guide plate.

Also, in the embodiments described above, although the description has been made with reference to the configuration where the diffusion layer is arranged adjacent to the light exit side of the phosphor layer for example, the diffusion layer may be disposed away from the phosphor layer, or another optical functional layer may be provided between the diffusion layer and the phosphor layer. Also, another functional layer may be arranged on the light exit side of the diffusion layer. Further, it may be provided on the light incident side of the phosphor layer, or may be provided on both of the light incident side and the light exit side.

Also, in the first embodiment and the Modifications 1 and 2, although the curved surface shape on the light exit side of the phosphor layer is formed by forming the concave-convex shape on the diffusion layer, it is not limited to thereto. The curved surface shape on the light exit side of the phosphor layer may be formed by providing one more base film between the diffusion layer having the flat-plate shape and the phosphor layer, and forming the concave-convex shape on that base film.

Also, in the first embodiment described above, although the description has been made with reference, as the color conversion layer in which the light path length is made equivalent independent of the angle direction incident on the color conversion layer, to the phosphor layer where the light exit surface or the light incident surface has the convex curved surface or the concave curved surface for each of the excitement light sources for example, the shape of the light exit surface and the shape of the light incident surface of the phosphor layer are not limited thereto. For example, it may be a configuration in which a thickness of the phosphor layer varies in a stepwise fashion according to the angle direction incident thereon, or may be in a shape in which a difference in the light path lengths is reduced according to the angle direction incident on the phosphor layer, such as a polyhedral shape.

Also, although the description has been made with reference, as the color conversion layer of the present invention, to the phosphor layer where the curved surface is formed on the light exit side or on the light incident side in the first and the second embodiments, and to the phosphor layer where the concentration of the color conversion material is made different for each of the regions for example, it is not limited thereto. The color conversion layer may be the one in which the concentration of the color conversion material is uniform for each of the regions, and which is in a flat-plate shape.

Also, in the third embodiment described above, although the description has been made with reference, as the color conversion layer of the present invention, to the phosphor layer where the concentration of the phosphor material (color conversion efficiency) varies in the stepwise fashion for each of the regions for example, it is not limited thereto. It may be a configuration in which the concentration of the phosphor material varies successively.

Also, in the embodiments described above, although the description has been made with reference to the liquid crystal display device utilizing the liquid crystal display panel for example, it is not limited thereto, and is applicable to other display devices.

The invention claimed is:

1. A light source device comprising:
   a light emitting section to output color light in a first wavelength region;
   a color conversion layer provided to be opposed to the light emitting section at a distance to convert a first part of the color light in the first wavelength region from the light emitting section into second color light in a second wavelength region, a wavelength of the second wavelength region being longer than that of the first wavelength region, and to output the second color light in the second wavelength region and to transmit a second part of the color light in the first wavelength region;
   wherein the light emitting section has a plurality of point sources of light arranged at intervals on a substrate, and the color conversion layer extends over an entire region of the substrate where the plurality of point sources of light are arranged;
   wherein the plurality of point sources of light are arranged on a plane, and the color conversion layer is arranged so as to be substantially parallel to the plane;
   wherein a color conversion efficiency of the color conversion layer for exiting light with respect to incident light from the plurality of point sources of light is uniform independent of positions within a region corresponding to the plurality of point sources of light;
   wherein an intensity of the first color light and the second color light output from the color conversion layer is uniform independent of an exit angle;
   wherein a light path length within the color conversion layer of light passing through the color conversion layer is uniform independent of the exit angle; and
   wherein a light exit surface of the color conversion layer in each region corresponding to each of the plurality of point sources of light is formed as a convex curved surface.

2. The light source device according to claim 1, wherein a light incident surface of the color conversion layer in each region corresponding to each of the plurality of point sources of light is formed as a concave curved surface, the convex curved surface, or a flat surface.

3. A light source device comprising:
   a light emitting section to output color light in a first wavelength region;
   a color conversion layer provided to be opposed to the light emitting section at a distance to convert a first part of the color light in the first wavelength region from the light emitting section into second color light in a second wavelength region, a wavelength of the second wavelength region being longer than that of the first wavelength region, and to output the second color light in the second wavelength region and to transmit a second part of the color light in the first wavelength region;
   wherein the light emitting section has a plurality of point sources of light arranged at intervals on a substrate, and the color conversion layer extends over an entire region of the substrate where the plurality of point sources of light are arranged;
   wherein the plurality of point sources of light are arranged on a plane, and the color conversion layer is arranged so as to be substantially parallel to the plane;
   wherein a color conversion efficiency of the color conversion layer for exiting light with respect to incident light from the plurality of point sources of light is uniform independent of positions within a region corresponding to the plurality of point sources of light;
   wherein an intensity of the first color light and the second color light output from the color conversion layer is uniform independent of an exit angle;
   wherein a light path length within the color conversion layer of light passing through the color conversion layer is uniform independent of the exit angle; and
   wherein a light incident surface of the color conversion layer in each region corresponding to each of the point sources of light is formed as a convex curved surface.

4. The light source device according to any one of claims 1 to 3, further comprising a transparent substrate which is in contact with the light incident surface of the color conversion layer to support the color conversion layer.

5. The light source device according to claim 1, further comprising a lens layer provided on a light incident surface side of the color conversion layer and refracting color light from each of the plurality of point sources of light to a direction in which the color lights are parallel one another.

6. The light source device according to claim 1, further comprising a lens layer,
   wherein the light conversion layer in each region corresponding to each of the point sources of light has a curved surface shape which is concave on a light incident surface side and is formed to have a uniform thickness, and
   the lens layer is provided on a light exit side of the color conversion layer along the curved surface shape of the color conversion layer and refracts the color light from each of the plurality of point sources of light in a direction in which the color lights are parallel one another.

7. The light source device according to claim 1, wherein the color conversion efficiency per unit-passage distance of light passing through the color conversion layer is different depending on positions within the region corresponding to the plurality of point sources of light.

8. The light source device according to claim 7, wherein concentration of a color conversion material in the color conversion layer is different depending on the positions within the region corresponding to each of the plurality of point sources of light.

9. The light source device according to claim 1, wherein
   the light emitting section has a plurality of point sources of light arranged on a surface of a support, and
   the color conversion layer is arranged along the surface of the support and is configured such that a central ray of light emitted from the plurality of point sources of light is incident vertically on a surface of the color conversion layer.

10. The light source device according to claim 9, wherein the plurality of point sources of light are arranged on a \ curved face, and
   the color conversion layer is arranged along the curved face.

11. The light source device according to claim 9, wherein the support has a rod-like shape, and the color conversion layer is so arranged as to surround the light emitting section and has a tubular shape which is concentric to the support of the light emitting section.

12. The light source device according to claim 11, wherein a surface shape of the support and a surface shape of the color conversion layer are of a curved surface body.

13. The light source device according to claim 11, wherein a surface shape of the support and a surface shape of the color conversion layer are of a polyhedron.

14. The light source device according to claim 1, wherein the plurality of point sources of light comprise blue light emitting diodes emitting light in a blue (B: Blue) wavelength region.

15. The light source device according to claim 14, wherein the color conversion layer converts the second part of the blue color light into a green color light in a green (G: Green) wavelength region and into a red color light in a red (R: Red) wavelength region, thereby to output a white light as a whole.

16. The light source device according to claim 1, wherein the color conversion layer comprises a phosphor material.

17. The light source device according to claim 1, further comprising a light diffusion layer provided on a light exit side of the color conversion layer.

18. A display device comprising:
a display panel to be driven based on image data; and
a light source device to irradiate to irradiate light toward the display panel,
wherein the light source device includes:
a light emitting section to output color light in a first wavelength region; and
a color conversion layer provided to be opposed to the light emitting section at a distance, to convert a first part of the color light in the first wavelength region from the light emitting section into second color light in a second wavelength region, a wavelength of the second wavelength region being longer than that of the first wavelength region, and to output the second color light in the second wavelength region and to transmit a second part of the color light in the first wavelength region;
wherein the light emitting section has a plurality of point sources of light arranged at intervals on a substrate, and the color conversion layer extends over an entire region of the substrate where the plurality of point sources of light are arranged;
wherein the plurality of point sources of light are arranged on a plane, and the color conversion layer is arranged so as to be substantially parallel to the plane,
wherein a color conversion efficiency of the color conversion layer for exiting light with respect to incident light from the plurality of point sources of light is uniform independent of positions within a region corresponding to the plurality of point sources of light;
wherein an intensity of the first color light and the second color light output from the color conversion layer is uniform independent of an exit angle;
wherein a light path length within the color conversion layer of light passing through the color conversion layer is uniform independent of the exit angle; and
wherein a light exit surface of the color conversion layer in each region corresponding to each of the plurality of point sources of light is formed as convex curved surface.

19. The display device according to claim 18, wherein the light emitting section has a plurality of point sources of light arranged on a plane, and
the color conversion layer is arranged so as to be substantially parallel to the plane.

20. The display device according to claim 19, wherein a color conversion efficiency of the color conversion layer for exiting light with respect to incident light from the point sources of light is uniform independent of positions within a region corresponding to the plurality of point sources of light.

21. The light source device according to claim 3, wherein the plurality of point sources of light comprise blue light emitting diodes emitting in a blue (B: Blue) wavelength region.

22. The light source device according to claim 3, wherein the color conversion layer comprises a phosphor material.

23. The light source device according to claim 3, further comprising a light diffusion layer provided on a light exit side of the color conversion layer.

24. A display device comprising:
a display panel to be driven based on image data; and
a light source device irradiating to irradiate light toward the display panel, wherein the light source device includes:
a light emitting section to output color light in a first wavelength region; and
a color conversion layer provided to be opposed to the light emitting section at a distance, to convert a first part of the color light in the first wavelength region from the light emitting section into second color light in a second wavelength region, a wavelength of the second wavelength region being longer than that of the first wavelength region, and to output the second color light in the second wavelength region and to transmit a second part of the color light in the first wavelength region,
wherein the light emitting section has a plurality of point sources of light arranged at intervals on a substrate, and the color conversion layer extends over an entire region of the substrate where the plurality of point sources of light are arranged,
wherein the plurality of point sources of light are arranged on a plane, and the color conversion layer is arranged so as to be substantially parallel to the plane,
wherein a color conversion efficiency of the color conversion layer for exiting light with respect to incident light from the plurality of point sources of light is uniform independent of positions within a region corresponding to the plurality of point sources of light,
wherein an intensity of the first color light and the second color light output from the color conversion layer is uniform independent of an exit angle,
wherein a light path length within the color conversion layer of light passing through the color conversion layer is uniform independent of the exit angle, and
wherein a light incident surface of the color conversion layer in each region corresponding to each of the point sources of light is formed as a convex curved surface.

25. The display device according to claim 24, wherein the light emitting section has a plurality of point sources of light arranged on a plane, and the color conversion layer is arranged so as to be substantially parallel to the plane.

26. The display device according to claim 25, wherein a color conversion efficiency of the color conversion layer for exiting light with respect to incident light from the point sources of light is uniform independent of positions within a region corresponding to the plurality of point sources of light.

* * * * *